US010365472B1

(12) United States Patent
Guntaka et al.

(10) Patent No.: US 10,365,472 B1
(45) Date of Patent: Jul. 30, 2019

(54) ELECTROWETTING DISPLAY DEVICE HAVING INCREASED VIEWING PERFORMANCE

(71) Applicant: Amazon Technologies, Inc., Seattle, WA (US)

(72) Inventors: Tulasi Sridhar Reddy Guntaka, Eindhoven (NL); Henricus Petronella Maria Derckx, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 14/982,792

(22) Filed: Dec. 29, 2015

(51) Int. Cl.
*G02B 5/02* (2006.01)
*G02B 5/08* (2006.01)
*G02B 26/00* (2006.01)
*G02B 5/20* (2006.01)

(52) U.S. Cl.
CPC ......... *G02B 26/005* (2013.01); *G02B 5/0284* (2013.01); *G02B 5/08* (2013.01); *G02B 5/201* (2013.01)

(58) Field of Classification Search
CPC ...... G02B 26/005; G02B 5/0284; G02B 5/08; G02B 5/201
See application file for complete search history.

(56) References Cited

U.S. PATENT DOCUMENTS

| | | | | |
|---|---|---|---|---|
| 6,894,747 B2* | 5/2005 | Okumura | .......... | G02F 1/133553 349/113 |
| 9,678,330 B1* | 6/2017 | Sakai | .......... | G02B 26/005 |
| 10,048,486 B1* | 8/2018 | Carneiro | .......... | G02B 26/005 |
| 2003/0214717 A1* | 11/2003 | Kaminsky | .......... | G02B 5/0221 359/599 |
| 2008/0278796 A1* | 11/2008 | Roosendaal | ...... | G02F 1/133553 359/296 |
| 2008/0297880 A1* | 12/2008 | Steckl | .......... | G02B 26/004 359/291 |
| 2009/0027760 A1* | 1/2009 | Wang | .......... | G02B 26/005 359/291 |
| 2011/0316764 A1* | 12/2011 | Parry-Jones | ......... | G02B 26/005 345/60 |
| 2012/0163021 A1* | 6/2012 | Bohn | .......... | G02F 1/133615 362/608 |
| 2013/0182410 A1* | 7/2013 | Gibson | .......... | G02F 1/133514 362/84 |
| 2013/0278987 A1* | 10/2013 | Sheng | .......... | G02F 1/133514 359/238 |
| 2013/0335805 A1* | 12/2013 | Dean | .......... | G02B 26/005 359/290 |
| 2014/0055833 A1* | 2/2014 | Gibson | .......... | G02F 1/133553 359/238 |
| 2015/0098066 A1* | 4/2015 | Jurbergs | .......... | G02B 26/001 355/2 |

* cited by examiner

*Primary Examiner* — Thomas K Pham
(74) *Attorney, Agent, or Firm* — EIP US LLP

(57) ABSTRACT

A display device includes a first support plate and a first pixel region on the first support plate. The first pixel region includes a first sub-pixel and a second sub-pixel. A specular reflector is positioned within the first pixel region and associated with the first sub-pixel and a diffuse reflector is positioned within the first pixel region and associated with the second sub-pixel.

17 Claims, 7 Drawing Sheets

US 10,365,472 B1

ELECTROWETTING DISPLAY DEVICE HAVING INCREASED VIEWING PERFORMANCE

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the performance, e.g., display performance including brightness, viewing angle, and/or color performance, may affect a user's experience with the electronic device and the content presented thereon. Accordingly, enhancing user experience and satisfaction continues to be a priority. Moreover, increased multimedia use imposes high demands on designing, packaging, and fabricating electronic display devices, as content available for mobile use becomes more extensive and device portability continues to be a high priority.

At least some conventional electronic displays include a metal reflector on a bottom plate of the display and an acrylic or polymer-based diffuser layer laminated over or coated on an opposite top plate of the display. As light enters the top plate through the diffuser layer the light is diffused and transmitted toward the metal reflector. The diffused light is then reflected by the metal reflector and diffused a second time as the reflected light exits the display through the top plate and the diffuse layer. In some instances, the diffuse layer has a thickness of about 200 micrometers which adds to an overall thickness of the top plate and may negatively affect a sharpness of the display image. For electrowetting displays, the resolution and display performance may also depend on other factors, such as an amount of required open area within each pixel or sub-pixel, a volume of oil within each pixel or sub-pixel, and a cell gap or a distance between the bottom plate and the top plate, for example.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
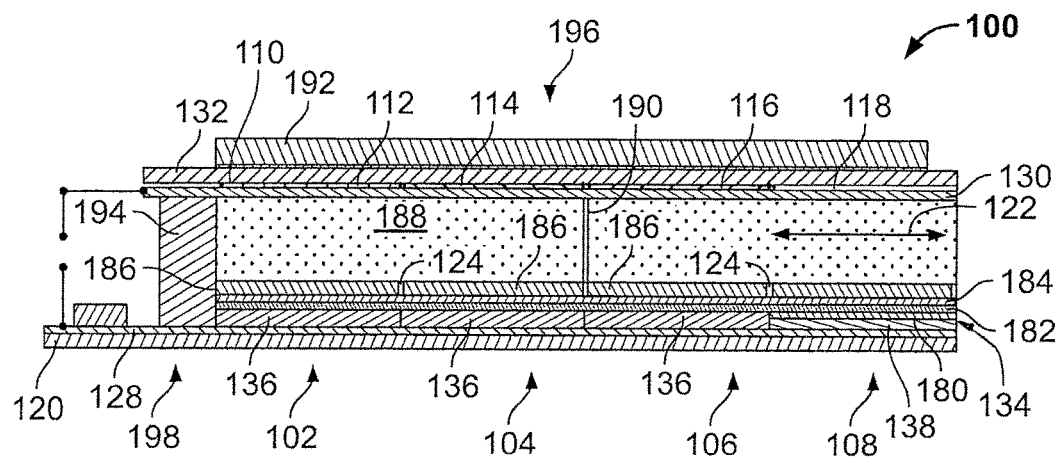
FIG. 1 is a cross-sectional view of the example electrowetting display device of FIG. 3 along sectional line 1-1, according to one embodiment.

In embodiments described herein, an electrowetting pixel region includes a reflective layer combining one or more specular reflectors with one or more diffuse reflectors for a desired combination of specular reflection and diffuse reflection of light within the electrowetting pixel region, to provide a display having an improved paper-like appearance while maintaining a desired brightness level. A pixel region may include an electrowetting element, one or more pixels, a pixel including a plurality of sub-pixels, or one or more sub-pixels of an electrowetting display device. Such an electrowetting element, pixel or sub-pixel may be the smallest light transmissive, reflective or transflective component of an electrowetting display that is individually operable to directly control an amount of light transmission through and/or reflection from the pixel region. For example, in some implementations, a pixel region may include a pixel having a red sub-pixel, a green sub-pixel, a blue sub-pixel, and a white sub-pixel for RGBW displays. In other implementations, a pixel region may include a pixel that is a smallest component of the electrowetting display, e.g., the pixel does not include any sub-pixels.

In certain embodiments described herein, an electrowetting display device includes a reflective layer positioned within an electrowetting pixel region, e.g., under or within a pixel configuration forming a plurality of electrowetting sub-pixels. Each electrowetting sub-pixel is at least partially formed by one or more respective pixel walls. A color filter layer positioned above the pixel configuration includes a plurality of color filters each associated with a respective electrowetting sub-pixel to form one of a red sub-pixel, a green sub-pixel, a blue sub-pixel, or a white sub-pixel. More specifically, a red color filter positioned over an electrowetting sub-pixel will form a red sub-pixel; a green color filter positioned over an electrowetting sub-pixel will form a green sub-pixel; a blue color filter positioned over an electrowetting sub-pixel will form a blue sub-pixel; and a white color filter positioned over an electrowetting sub-pixel will form a white sub-pixel. In the example embodiment, the white color filter is a transparent color filter transmitting all wavelengths of visible light. The white color filter may be formed of a transparent material or may be an opening formed through the color filter layer, for example. In certain embodiments, the color filter may be considered as a part of the electrowetting sub-pixel or, alternatively, the color filter may be considered an independent component positioned on or over the electrowetting sub-pixel, e.g., within or above the electrowetting pixel region. For example, in one embodiment, the color filter layer is positioned above a first pixel region. The color filter layer includes a first color filter associated with a first sub-pixel within the first pixel region to form one of a red sub-pixel, a green sub-pixel, or a blue sub-pixel, and a second color filter associated with the second sub-pixel within the first pixel region to form the white sub-pixel. The electrowetting sub-pixels may have one or more specific and/or additional structural features.

In one embodiment, a corresponding specular reflector of a plurality of specular reflectors is positioned with respect to or associated with, e.g., within or under, each of the red sub-pixel, the green sub-pixel, and the blue sub-pixel and a diffuse reflector is positioned with respect to or associated with, e.g., within or under, the white sub-pixel within the electrowetting pixel region. In a particular embodiment, the white sub-pixel also includes a specular reflector such that the specular reflector is positioned within a first portion of the white sub-pixel and the diffuse reflector is positioned within a second portion of the white sub-pixel different from the first portion. In certain embodiments, individual white sub-pixels include a diffuse reflector having a diffusivity equal to or greater than 50% and, more particularly, a diffusivity of 50% to 95%. In alternative embodiments, the individual white sub-pixels include a diffuse reflector having a diffusivity less than 50% or greater than 95%.

As described herein, by including a diffuse reflector in the white sub-pixel (with or without a specular reflector), viewing performance under normal or oblique viewing angles and/or under certain lighting conditions is improved. The white sub-pixel in the pixel configuration described herein provides additional luminance and/or brightness when compared to a conventional red, green, blue (RGB) stripe pixel configuration. Moreover, the implementation of a specular reflector and a diffuse reflector in the white sub-pixel may provide a more uniform diffuse performance due to the spectral nature of the white sub-pixel, i.e., all wavelengths of visible light are reflected from the white sub-pixel. Further, while in certain embodiments each of the red sub-pixels, the green sub-pixels, and the blue sub-pixels within a display device includes only a specular reflector, in a particular embodiment, one or more green sub-pixels within a display device may also include a diffuse reflector such that the specular reflector is positioned within a first portion of the green sub-pixel and the diffuse reflector is positioned within a second portion of the green sub-pixel different from the first portion. The implementation of a diffuse reflector (in addition to or in lieu of the specular reflector) in the green sub-pixel may further increase the viewing performance.

During operation of the electrowetting display device, light entering the electrowetting display device through a top support plate may be reflected as a voltage source applies a voltage over the electrode layers, i.e., a first or sub-pixel electrode and a second or top electrode to cause displacement of a fluid, such as a first fluid, contained within one or more electrowetting sub-pixels. The light travels into each electrowetting pixel region and, depending on which portion of the reflective layer the light impinges upon, the light is reflected by the reflective layer as specular reflected light or diffuse reflected light which then travels out of the electrowetting display device through the top support plate. As described in greater detail below, a position, a configuration and/or one or more dimensions of each of the specular reflector and the diffuse reflector may be selected to optimize a performance of the electrowetting display device by adjusting the diffuse reflectance to provide a more paper-like appearance while maintaining a desired brightness level provided by the specular reflectance. Moreover, a mechanical strength of the electrowetting pixel region may be increased by decreasing a cell gap defined as a distance between a top surface of the pixel wall and a bottom surface of a top support plate, and this distance is substantially equal to a length of a spacer positioned between the pixel wall and the top support plate. In certain embodiments, decreasing the cell gap, may also increase a viewing angle of the display and/or a resolution of the display, while providing the more paper-like appearance. In general, the term "specular reflection" or "specular reflectance" refers to a mirror-like reflection of light from a surface in which light from a single incoming angle or direction (an incident ray) is reflected in a single outgoing angle or direction. In general, the term "diffuse reflection" or "diffuse reflectance" refers to the reflection of light from a surface in which an incident ray is reflected at more than one angle or direction, e.g., many angles or directions, rather than at only one angle or direction as in the case of specular reflection.

To optimize the display performance, therefore, as disclosed in certain embodiments herein, the electrowetting display device includes specular reflectors positioned with respect to each red sub-pixel, green sub-pixel, and blue sub-pixel and diffuse reflectors positioned with respect to each white sub-pixel to optimize the specular reflectance and/or the diffuse reflectance within the electrowetting pixel regions and provide a more paper-like appearance while maintaining a desired brightness level. In particular embodiments, both a specular reflector and a diffuse reflector are positioned with respect to one or more white sub-pixels at a plane of the reflective layer. In a further embodiment, both a specular reflector and a diffuse reflector are positioned with respect to one or more green sub-pixels at a plane of the reflective layer. Because a human's eye is more sensitive to the green light portion of the visible light spectrum than to the red light portion and the blue light portion of the visible light spectrum, one or more diffuse reflectors positioned with respect to the green sub-pixel may improve the optical properties of an electrowetting display device. For example, positioning one or more diffuse reflectors with respect to the green sub-pixel may increase the diffusivity of the display without negatively affecting the uniformity of light diffusion. In various embodiments described herein, electronic devices, e.g., electrowetting display devices, include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

An electrowetting sub-pixel is at least partially defined by one or more pixel walls that surround or are otherwise associated with at least a portion of the electrowetting sub-pixel. The pixel walls form a structure that is configured to contain at least a portion of a first fluid, such as an opaque oil. Light transmission through or reflection from the electrowetting sub-pixel is controlled by the application of an electric potential to the electrowetting sub-pixel, which results in a movement of a second fluid, such as an electrolyte solution, into the electrowetting sub-pixel, thereby displacing the first fluid.

When the electrowetting sub-pixel is in an off state (i.e., with no electric potential applied), the first fluid, e.g., the opaque oil, is distributed throughout the electrowetting sub-pixel to substantially cover the display surface area of the electrowetting sub-pixel. The first fluid absorbs light and the electrowetting sub-pixel in this condition appears black in one embodiment. But when the electric potential is applied, the electrowetting sub-pixel is in an on state and the first fluid is displaced to one or more sides of the electrowetting sub-pixel, for example, providing a gray-scale value in the sub-pixel in certain embodiments. The on state includes all states with a specific voltage applied to display a grey scale. Light can then enter the electrowetting sub-pixel and impinge upon one or more surfaces of the reflective layer positioned at or near a bottom surface of the electrowetting sub-pixel or under the electrowetting sub-pixel. The light is then reflected by the reflective layer and reflects out of the electrowetting sub-pixel, causing the electrowetting sub-pixel to appear red, green, blue or white to an observer. For example, if the one or more reflective surfaces reflect only a portion of the light spectrum or if color filters are incorporated into the electrowetting pixel region or sub-pixel structure or area, the electrowetting sub-pixel may appear to have color.

A display device, such as an electrowetting display device, may include a transmissive, reflective or transflective display that generally includes an array of pixels (e.g., which may comprise sub-pixels) or sub-pixels configured to be operated by an active matrix addressing scheme. For example, rows and columns of electrowetting sub-pixels are operated by controlling voltage levels on a plurality of source lines and gate lines. In this fashion, the display device may produce an image by selecting particular sub-pixels to transmit, reflect or block light. Sub-pixels are addressed (e.g., selected) via rows and columns of the source lines and the gate lines that are electrically connected to transistors (e.g., used as switches) included in each sub-pixel. Transistors take up a relatively small fraction of the area of each sub-pixel to allow light to efficiently pass through (or reflect from) the sub-pixel. In certain embodiments, a pixel includes two or more sub-pixels of an electrowetting display device. In other embodiments, a pixel may be a smallest component, e.g., the pixel does not include any sub-pixels.

The array of pixels or sub-pixels is sandwiched between two support plates, such as a bottom support plate and an opposing top support plate. For example, a bottom support plate in cooperation with a top support plate may contain pixels that include electrowetting oil, electrolyte solution and pixel walls between the support plates. The support plates may be made of any suitable material including, without limitation, plastic (e.g., a transparent thermoplastic material such as a poly(methyl methacrylate) (PMMA) or other acrylic), glass, quartz, and semiconducting materials, and may be made of a rigid material or a flexible material, for example. Pixels include various layers of materials built upon the bottom support plate. One example layer is a fluoropolymer (e.g. Teflon® AF1600®) with hydrophobic behavior. The pixel walls may be formed on a top surface of the hydrophobic layer, or, alternatively, may be formed before the hydrophobic layer is deposited, for example. The bottom support plate may be opaque while the top support plate is transparent. Describing a pixel or material as being "transparent" generally means that the pixel or material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the plate through which a viewer views pixels of a (reflective) electrowetting display.

As described above, individual reflective electrowetting pixel regions may include an electrode layer containing the drive electronics like TFTs, source lines, and gate lines on the bottom support plate, a reflective layer adjacent to or on the electrode layer, a pixel or sub-pixel electrode on the reflective layer, a barrier layer on the reflective layer, and a hydrophobic layer on the barrier layer. The reflector layer itself can act as the pixel or sub-pixel electrode or an additional pixel electrode, e.g., formed from ITO, can be deposited on the reflector layer. The pixel or sub-pixel electrode in principle is close to the fluids in the pixel region to minimize power consumption. In one embodiment, the pixel or sub-pixel electrode is deposited over the reflective layer. In an alternative embodiment, the pixel or sub-pixel electrode is under the reflective layer. The electrode layer as shown in FIGS. 1, 2, 4, and 5 can be an electrode layer containing the drive electronics if the reflective layer is used as the pixel or sub-pixel electrode, e.g., the sub-pixel electrode comprises a specular reflector and/or a diffuse reflector, or the electrode layer can contain the pixel or sub-pixel electrodes in contact with the reflective layer. Pixel walls of each pixel or sub-pixel, the hydrophobic layer, and the transparent top support plate at least partially enclose a fluid region within the cavity that includes the first fluid, e.g., a liquid, which is electrically non-conductive, e.g., an opaque oil retained in the individual electrowetting pixels or sub-pixels by pixel walls, and the second fluid, e.g., a liquid or an electrolyte solution, that is electrically conductive or polar and may be a water or a salt solution, such as a solution of potassium chloride in water. The second fluid may be transparent, but may be colored or light-absorbing. The second fluid is immiscible with the first fluid. In general, substances are immiscible with one another if the substances do not substantially form a solution, although in a particular embodiment the second fluid might not be perfectly immiscible with the first fluid. In general, an "opaque" fluid is a fluid that appears black to an observer. For example, an opaque fluid strongly absorbs a broad spectrum of wavelengths (e.g., including those of red, green and blue light) in the visible region of electromagnetic radiation appearing black. However, in certain embodiments an opaque fluid may absorb a relatively narrower spectrum of wavelengths in the visible region of electromagnetic radiation and may not appear perfectly black.

In some embodiments, the first fluid is a nonpolar electrowetting oil. In certain embodiments, the first fluid may absorb at least a portion of the visible light spectrum. The first fluid may be transmissive for a portion of the visible light spectrum, forming a color filter. For this purpose, the first fluid may be colored by addition of pigment particles or a dye. Alternatively, the first fluid may be black, for example by absorbing substantially all portions of the visible light spectrum, or reflecting. A reflective first fluid may reflect the entire visible light spectrum, making the layer appear white, or a portion of the entire visible light spectrum, making the layer have a color. In example embodiments, the first fluid is black and, therefore, absorbs substantially all portions of an optical light spectrum, for example, in the visible light spectrum.

Spacers and edge seals mechanically connect the first or bottom support plate with the overlying second or top support plate, or form a separation between the first support plate and the second support plate, to contribute to the mechanical integrity of the electrowetting display device. Edge seals, for example, disposed along a periphery of an array of electrowetting pixels or sub-pixels, may contribute to retaining fluids (e.g., the first fluid and the second fluid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels or sub-pixels of the electrowetting display device based, at least in part, on electronic signals representative of image and/or video data. The code may cause the processor to modulate the optical properties of pixels or sub-pixels by controlling electrical signals (e.g., voltages, currents, and fields) on, over, and/or in layers of the electrowetting display device.

Figure 2:
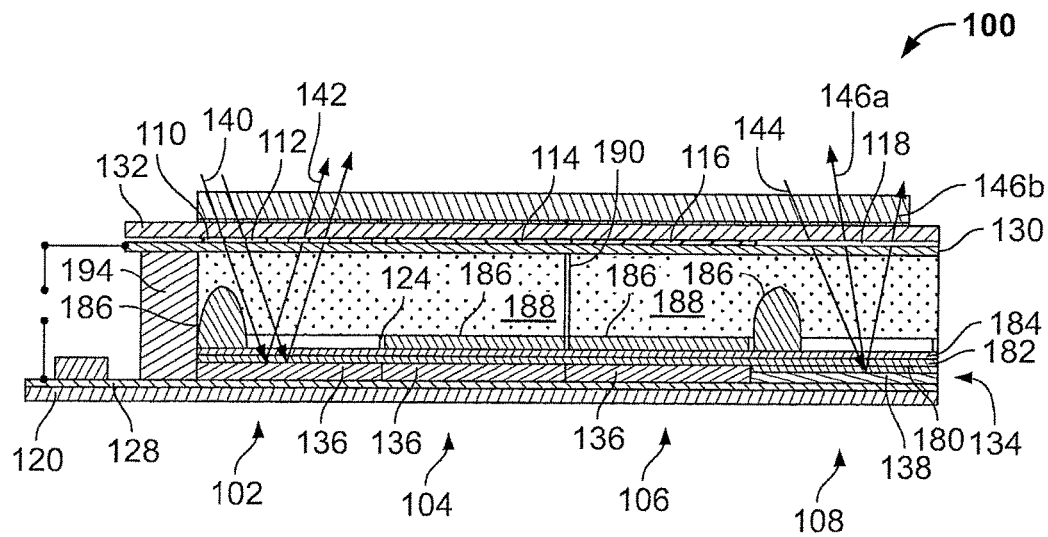
FIG. 2 is a cross-sectional view of the electrowetting display device of FIG. 3 along sectional line 1-1 with two sub-pixels activated to expose at least a portion of a reflective layer.
Figure 3:
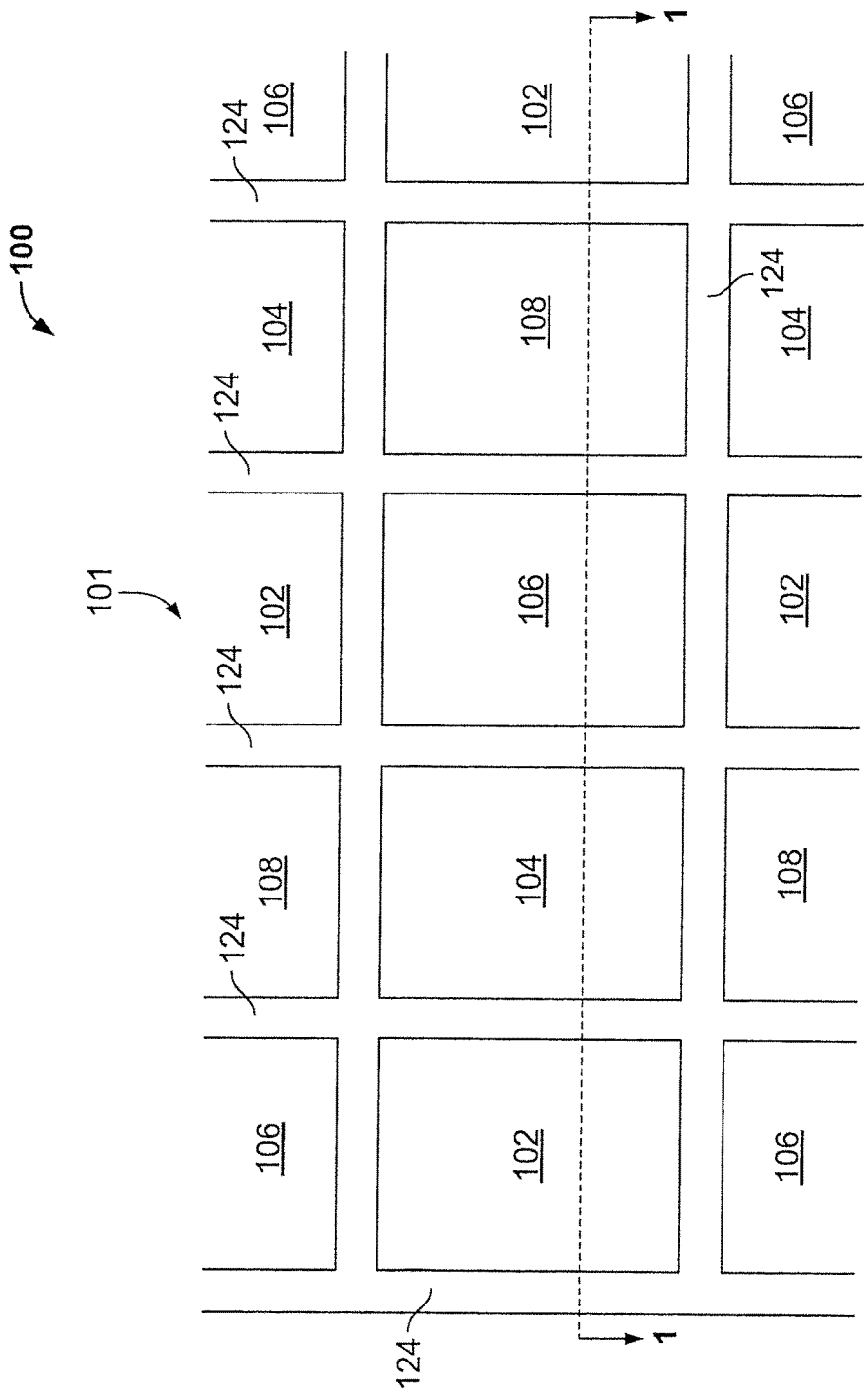
FIG. 3 is a top view of a plurality of electrowetting sub-pixels of an example electrowetting display device.

Referring now to the figures, FIG. 1 is a cross-sectional view of a portion of an example reflective electrowetting display device 100 including a pixel region having an example RGBW pixel configuration 101 with a plurality of electrowetting sub-pixels, e.g., red sub-pixel 102, green sub-pixel 104, blue sub-pixel 106, and white sub-pixel 108 taken along a sectional line 1-1 of FIG. 3. In alternative embodiments, RGBW pixel configuration 101 may have any suitable configuration and/or sequence of red sub-pixels 102, green sub-pixels 104, blue sub-pixels 106, and white sub-pixels 108. As shown in FIGS. 1 and 2, for example, in exemplary embodiments, one or more color filters, e.g., red color filter 112, green color filter 114, blue color filter 116, and white color filter 118, are positioned with respect to or associated with respective sub-pixels to at least partially form the respective red sub-pixel 102, green sub-pixel 104, blue sub-pixel 106, and white sub-pixel 108. FIG. 2 shows the same cross-sectional view as FIG. 1 in which an electric potential has been applied to red sub-pixel 102 and white sub-pixel 108 causing displacement of a first fluid disposed therein, as described below. Four complete electrowetting sub-pixels 102, 104, 106, 108 are shown in cross-section in FIGS. 1 and 2. FIG. 3 is a top view of example reflective electrowetting display device 100 including the example RGBW pixel configuration 101 having a plurality of electrowetting sub-pixels 102, 104, 106, 108 formed over a first or bottom support plate 120 (shown in FIGS. 1 and 2). In the example embodiments, electrowetting sub-pixels 102, 104, 106, 108 have identical or similar structure and dimensions, with the respective color filter positioned with respect to the respective sub-pixel. In alternative embodiments, one or more sub-pixels 102, 104, 106, 108 may have a different structure and/or one or more different dimensions than the other sub-pixels 102, 104, 106, 108. Referring to FIG. 1, for example, each electrowetting sub-pixel 102, 104, 106, 108 defines a display surface area 122. More specifically, in this embodiment display surface area 122 is defined by pixel walls 124, as described below, having a first dimension, such as a width, between opposing lateral pixel walls 124, and a second dimension, such as a length, between the remaining opposing pixel walls 124. Electrowetting display device 100 may include any suitable number (usually a very large number, such as thousands or millions), sequence, and/or combination of electrowetting sub-pixels 102, 104, 106, 108.

Referring further to FIGS. 1 and 2, an electrode layer 128 having one or more pixel or sub-pixel electrodes is formed on bottom support plate 120 and between electrowetting sub-pixels 102, 104, 106, 108 and bottom support plate 120. Electrode layer 128 and/or the one or more pixel or sub-pixel electrodes are operatively coupled to a second electrode 130 positioned adjacent, e.g., under, a top support plate 132 described below. Alternatively, second electrode 130 may be positioned along a side of the display in contact with the second fluid. These example embodiments are not limiting with respect to the location of the first and second electrode, and claimed subject matter is not limited in this respect. As shown in FIGS. 1 and 2, for example, in exemplary embodiments, a filter layer including color filters 112, 114, 116, 118 may be positioned between second electrode 130 and top support plate 132. In particular embodiments, one or more additional layers may be positioned between electrode layer 128 and bottom support plate 120, in which TFTs, gates, and/or source lines are located, for example. In these embodiments, electrode layer 128 may not be formed directly on bottom support plate 120. In various embodiments, electrode layer 128 may be connected to any number of transistors, such as suitable thin film transistors (TFTs) (not shown), that are switched to either select or deselect corresponding electrowetting sub-pixels 102, 104, 106, 108 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

In example embodiments, electrode layer 128 includes a plurality of sub-pixel electrodes. Each sub-pixel electrode is associated with one sub-pixel for applying a voltage within the associated sub-pixel to cause displacement of the oil to expose at least a portion of the reflective layer. In these embodiments, data for a pixel region consisting of RGBW sub-pixels is converted into individual voltage values to put on the individual sub-pixels. For example, a first sub-pixel electrode is associated with a first sub-pixel for applying a voltage within the first sub-pixel to cause displacement of the first fluid within the first sub-pixel and a second sub-pixel electrode is associated with a second sub-pixel for applying a voltage within the second sub-pixel to cause displacement of the first fluid within the second sub-pixel. More specifically, a first sub-pixel electrode is associated with red sub-pixel 102, a second sub-pixel electrode is associated with green sub-pixel 104, a third sub-pixel electrode is associated with blue sub-pixel 106, and a fourth sub-pixel electrode is associated with white sub-pixel 108. Each sub-pixel electrode is configured for applying a voltage within the associated sub-pixel 102, 104, 106, 108 to cause displacement of the first fluid, e.g., the oil, within the associated sub-pixel to expose one or more portions of a reflective layer 134.

As shown in FIGS. 1 and 2, for example, reflective layer 134 is positioned adjacent, e.g., on electrode layer 128. In particular embodiments, one or more additional layers may be positioned between reflective layer 134 and electrode layer 128. In these embodiments, reflective layer 134 may not be formed directly on electrode layer 128. In an alternative embodiment, reflective layer 134 is positioned under a transparent electrode layer. In this alternative embodiment, reflective layer 134 is positioned between the transparent electrode layer and bottom support plate 120. In a further alternative embodiment, each sub-pixel electrode may include a specular reflector and/or a diffuse reflector. Reflective layer 134 may reflect light within the entire visible spectrum, making the layer appear relatively white, or reflect a portion of light within the visible spectrum, making the layer have a color. In this embodiment, reflective layer 134 includes a specular reflector 136 positioned within the pixel region, e.g., under or within red sub-pixel 102, green sub-pixel 104, and blue sub-pixel 106, and a diffuse reflector 138 positioned within the pixel region, e.g., under or within white sub-pixel 108. This configuration may be referred to as a planar diffuse reflector configuration, i.e., a bottom surface of diffuse reflector 138 adjacent or near electrode layer 128 is coplanar with a bottom surface of specular reflector 136 adjacent or near electrode layer 128.

In certain embodiments, specular reflector 136 is formed or made of any suitable materials including, for example, a metal (90%, 95% or greater than 95% metal), an alloy, a doped metal, or a dielectric reflector material. Suitable metal materials for specular reflector 136 include, without limitation, aluminum, silver, gold, copper, nickel, platinum, rhodium, lanthanum, and/or silicon nickel. Suitable alloy materials for specular reflector 136 include, without limitation, aluminum with copper or aluminum with nickel. In alternative embodiments, specular reflector 136 is made of any suitable material providing a desired specular reflectance. In certain embodiments, diffuse reflector 138 is made of a suitable diffuse reflective material positioned or deposited on or over electrode layer 128 and/or on or over specular reflector 136. Although diffuse reflector 138 may include any suitable diffuse reflective material providing a desired diffuse reflectance, in a particular embodiment, the diffuse reflective material of diffuse reflector 138 is titanium dioxide (TiO$_2$). In other embodiments, a portion of a specular reflector may be surface treated to form a diffuse reflector.

Referring further to FIG. 2, with an electric potential applied to red sub-pixel 102 causing displacement of a first fluid disposed within red sub-pixel 102, light entering electrowetting display device 100 travels into red sub-pixel 102 and impinges upon specular reflector 136. For example, an incident light ray, such as light ray 140, impinging upon specular reflector 136 at a single incoming angle or direction is reflected by a surface of specular reflector 136 in a single mirror-like outgoing angle or direction as light ray 142. Conversely, with an electric potential applied to white sub-pixel 108 causing displacement of a first fluid disposed within white sub-pixel 108, light entering electrowetting display device 100 travels through white sub-pixel 108 and impinges upon diffuse reflector 138. For example, an incident light ray, such as light ray 144, impinging upon a surface of diffuse reflector 138 at a single incoming angle or direction is reflected by diffuse reflector 138, in a plurality of outgoing angles or directions as a plurality of light rays, such as light ray 146a and light ray 146b for example.

In certain embodiments, a degree of diffusion or a diffuse reflectance can be characterized by diffusivity. Diffusivity is defined as a ratio between diffuse reflectance (SCE) to that of specular reflectance (SCI), as set forth below:

$$\text{Diffusivity} = \frac{SCE}{SCI},$$

where SCI is "Specular Component Included" and SCE is "Specular Component Excluded." Both SCI and SCE are measured with a suitable device, such as a Konica Minolta spectrophotometer CM-2600D.

For example, in a display that does not include a diffuse layer, a diffusivity may be as low as a few percent (as low as 5%). This low percent diffusivity may be due to inherent scattering that occurs at different layers of the display device. The same diffusivity can be increased to about 63% with a limited viewing angle using a conventional diffuser layer laminated over an outer surface of the display, e.g., laminated on top support plate 132. The diffusivity may be enhanced to 90% or greater with other special diffusers having a completely different viewing angle experience. A lambertian diffuser may have a diffusivity of 99% or greater, approaching 100%. The example embodiments described herein produce a display with a diffusivity of at least 50%, and, more specifically, between 50% and 95%. In certain embodiments, the diffusivity of the example embodiments is greater than 95%.

Electrowetting sub-pixels 102, 104, 106, 108 may have specific and/or additional structural features. Additionally or alternatively, reflective layer 134 may have structural features, for example, one or more relatively thinner areas and/or one or more relatively thicker areas within reflective layer 134 to control movement of the fluids. Alternatively, reflective layer 134 may be deposited on a structural feature conforming to a shape of the structural feature.

Figure 4:
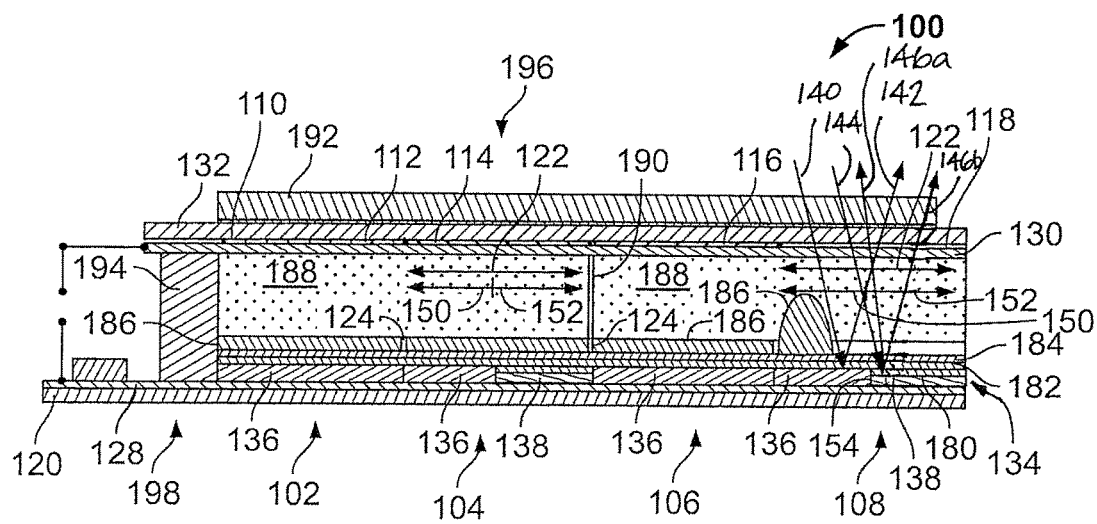
FIG. 4 is a cross-sectional view of an alternative example electrowetting display device, according to one embodiment.
Figure 5:
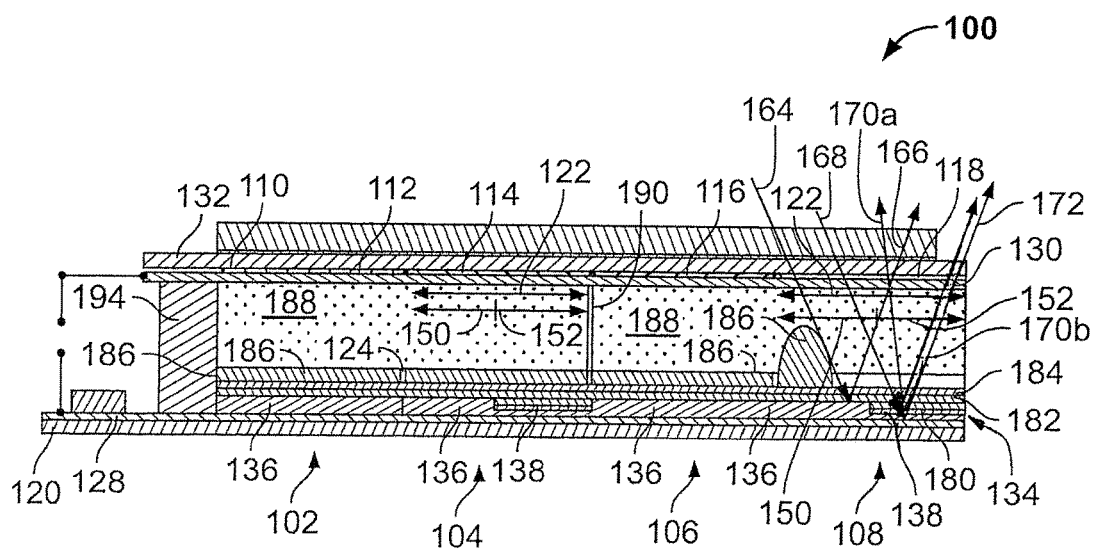
FIG. 5 is a cross-sectional view of an alternative example electrowetting display device, according to one embodiment.

Referring further to FIGS. 4 and 5, in certain alternative embodiments, one or more electrowetting sub-pixels 102, 104, 106, 108 includes one or more specular reflectors 136 and one or more diffuse reflectors 138. For example, as shown in FIG. 4, in certain embodiments, one specular reflector 136 is positioned on or within electrode layer 128 with respect to, e.g., within or under, at least a first portion 150 of display surface area 122 of white sub-pixel 108 and one diffuse reflector 138 is positioned on or within electrode layer 128 with respect to, e.g., within or under, a second portion 152 of display area 122 of white sub-pixel 108 different from first portion 150. In certain embodiments, first portion 150 and second portion 152 at least partially form or define display surface area 122. While a boundary 154 (as shown in FIG. 4, for example) between specular reflector 136 and diffuse reflector 138 is linear, in alternative embodiments boundary 154 may be non-linear having any suitable profile. As such, boundary 154 is not limited to the location as shown in the figures.

In a particular embodiment, in addition to white sub-pixel 108 including one or more specular reflectors 136 and one or more diffuse reflectors 138, green sub-pixel 104 also includes one or more specular reflectors 136 and one or more diffuse reflectors 138. In this embodiment, one specular reflector 136 is positioned on or within electrode layer 128 with respect to, e.g., within or under, at least first portion 150 of display surface area 122 of green sub-pixel 104 and one diffuse reflector 138 is positioned on or within electrode layer 128 with respect to, e.g., within or under, second portion 152 of display area 122 of green sub-pixel 104 different from first portion 150.

Referring further to FIG. 4, with an electric potential applied to white sub-pixel 108 causing displacement of a first fluid disposed within white sub-pixel 108, an incident light ray, such as light ray 140, impinging upon specular reflector 136 at a single incoming angle or direction is reflected by a surface of specular reflector 136 in a single mirror-like outgoing angle or direction as light ray 142. Conversely, an incident light ray, such as light ray 144, impinging upon a surface of diffuse reflector 138 at a single incoming angle or direction is reflected by diffuse reflector 138, in a plurality of outgoing angles or directions as a plurality of light rays, such as light ray 146a and light ray 146b for example.

In an alternative example embodiment as shown in FIG. 5, reflective layer 134 includes specular reflector 136 positioned on electrode layer 128 with respect to, e.g., under, at least first portion 150 of display surface area 122 of white sub-pixel 108 and diffuse reflector 138 positioned with respect to, e.g., under, second portion 152 of display surface area 122 of white sub-pixel 108 different from first portion 150. Similarly, in a particular embodiment, reflective layer 134 includes specular reflector 136 positioned on electrode layer 128 with respect to, e.g., under, at least first portion 150 of display surface area 122 of green sub-pixel 104 and diffuse reflector 138 positioned with respect to, e.g., under, second portion 152 of display surface area 122 of green sub-pixel area 104 different from first portion 150. However, in this embodiment, specular reflector 136 extends at least partially into second portion 152 of display surface area 122 between diffuse reflector 138 and electrode layer 128 such that specular reflector 136 contacts at least a portion of a bottom surface of diffuse reflector 138. In this embodiment as shown in FIG. 5, specular reflector 136 extends along the entire dimension of diffuse reflector 138 between diffuse reflector 138 and electrode layer 128. This configuration may be referred to as an elevated diffuse reflector configuration, i.e., a bottom surface of diffuse reflector 138 adjacent electrode layer 128 is not coplanar with a bottom surface of specular reflector 136 adjacent electrode layer 128 but, rather, specular reflector 136 is positioned under diffuse reflector 138 between diffuse reflector 138 and electrode layer 128. In particular embodiments, one or more additional layers may be positioned between reflective layer 134 and electrode layer 128. In these embodiments, reflective layer 134 may not be formed directly on electrode layer 128.

Referring further to FIG. 5, with an electric potential applied to white sub-pixel area 108 causing displacement of a first fluid disposed within white sub-pixel 108, incident light ray 164, for example, impinging upon specular reflector 136 at a single incoming angle or direction is reflected by a surface of specular reflector 136 in a single mirror-like outgoing angle or direction as light ray 166, while incident light ray 168, for example, impinging upon a surface of diffuse reflector 138 at a single incoming angle or direction is potentially reflected by diffuse reflector 138 in a plurality of outgoing angles or directions as light ray 170a and light ray 170b, for example. In this embodiment, an incident light ray, such as light ray 168, may be partially diffused at a surface of diffuse reflector 138 in a plurality of outgoing angles or directions as light ray 170a and light ray 170b, for example. Light ray 168 may continue to travel through diffuse reflector 138 and impinge upon specular reflector 136 positioned with respect to second portion 152 of display surface area 122 at a single incoming angle or direction and be reflected by a surface of specular reflector 136 in a single mirror-like outgoing angle or direction as light ray 172.

Similar to the embodiment shown in FIGS. 1-3, in the embodiments shown in FIGS. 4 and 5, electrowetting sub-pixels 102, 104, 106, 108 may have specific and/or additional structural features. Additionally or alternatively, reflective layer 134 may have structural features, for example one or more relatively thinner areas and/or one or more relatively thicker areas within reflective layer 134 to control movement of the fluids. Alternatively, reflective layer 134 may be deposited on a structural feature conforming to a shape of the structural feature.

Referring again to FIGS. 1 and 2, for example, in a particular embodiment, a planarization layer 180 is formed on diffuse reflector 138 to enhance the electrowetting properties of electrowetting sub-pixel 108. In one embodiment, planarization layer 180 is transparent. More specifically, planarization layer 180 enhances oil movement without negatively affecting optical performance of electrowetting sub-pixel 108. Planarization layer 180 may be formed to wholly cover each diffuse reflector 138. For example, planarization layer 180 may be formed by using a negative type photoresist compound. Planarization layer 180 may be formed by a spin coating method and/or a slit coating method. A method of forming planarization layer 180 is not limited to the coating method. Planarization layer 180 may be formed by using an ink-jet printing process, a screen or silk printing process, a one drop filling (ODF) process, a transfer process, or a rolling process, for example. A desired thickness of planarization layer 180 may be removed through an ashing process to form a mask pattern in certain embodiments.

In an alternative embodiment, planarization layer 180 is formed using a positive type photoresist compound. When a layer of light responsive compound forming the planarization layer 180 is exposed to light, light is provided to the layer, and a partial exposure process of the layer may be performed. That is, when planarization layer 180 is manufactured from the positive type photoresist compound, a specific thickness or pattern of planarization layer 180 is light reacted by the partial exposure process to remove the specific thickness or pattern of planarization layer 180.

A suitable dielectric barrier layer 182 may at least partially separate electrode layer 128 from a hydrophobic layer 184, such as a fluoropolymer layer for example, forming a bottom surface of sub-pixels 102, 104, 106, 108. For example, dielectric barrier layer 182 in certain embodiments is deposited on the patterned planarization layer 180 and specular reflector 136 not covered by planarization layer 180. Dielectric barrier layer 182 may be formed from various materials, e.g. silicon dioxide ($SiO_2$) and polyimide layers. A thickness of the insulating layer may be less than 2 micrometers and may be less than 1 micrometer; for example, the insulating layer may be 400 nanometers or less in thickness. In some embodiments, hydrophobic layer 184 is an amorphous fluoropolymer layer including any suitable fluoropolymer(s), such as AF1600®, produced by DuPont, based in Wilmington, Del. Hydrophobic layer 184 may be transparent or colored.

A plurality of pixel walls 124 form patterned electrowetting pixel configuration 101 on hydrophobic layer 184. Pixel walls 124 may include a photoresist material such as, for example, epoxy-based negative photoresist SU-8. Patterned RGBW pixel configuration 101 includes a plurality of rows and a plurality of columns that form an array of electrowetting sub-pixels, such as shown in FIG. 3, including a plurality of electrowetting sub-pixels 102, 104, 106, 108 that may have a width and a length in a range of about 50 to 500 micrometers, for example.

A first fluid 186, which may have a thickness (e.g., a height as shown in FIGS. 1 and 2 for example) in a range of about 1 to 10 micrometers, for example, overlays hydrophobic layer 184. First fluid 186, e.g., a liquid such as an oil, is partitioned by pixel walls 124 of patterned RGBW pixel configuration 101. A second fluid 188, e.g., a liquid such as an electrolyte solution, overlays first fluid 186 and pixel walls 124 of patterned RGBW pixel configuration 101. In certain embodiments, as described above, second fluid 188 may be electrically conductive and/or polar. For example, second fluid 188 may be water, or a salt solution such as a solution of potassium chloride in water or a mixture of water and ethyl alcohol. In certain embodiments, second fluid 188 is transparent, but may be colored or absorbing. First fluid 186 is electrically non-conductive and may for example be an alkane like hexadecane or (silicone) oil. First fluid 186 is immiscible with second fluid 188.

Second or top support plate 132 covers second fluid 188 and one or more spacers 190 to maintain second fluid 188 over RGBW pixel configuration 101. In one embodiment, spacer 190 extends from top support plate 132 and may rest upon a top surface of one or more pixel walls 124. In alternative embodiments, spacer 190 does not rest on pixel wall 124 but is substantially aligned with pixel wall 124. This arrangement may allow spacer 190 to come into contact with pixel wall 124 upon a sufficient pressure or force being applied to top support plate 132. Multiple spacers 190 may be interspersed throughout RGBW pixel configuration 101. A diffuser layer 192 may be applied to an outer surface of at least a portion of top support plate 132 to provide additional diffusion of light entering and exiting electrowetting display device 100 as desired. As shown in FIGS. 1, 2, 4, and 5, a seal 194 extends about a perimeter of electrowetting display device 100 to contain first fluid 186 and second fluid 188 within the fluid region of the cavity.

A voltage applied across, among other things, second fluid 188 and electrode layer 128 of individual electrowetting sub-pixels 102, 104, 106, 108 may control transmittance or reflectance of the individual electrowetting sub-pixels 102, 104, 106, 108.

Reflective electrowetting display device 100 has a viewing side 196 corresponding to top support plate 132 through which an image formed by reflective electrowetting display device 100 may be viewed, and an opposing rear side 198 corresponding to bottom support plate 104 as shown, for example, in FIGS. 1 and 4. Reflective electrowetting display device 100 may be a segmented display type in which the image is built of segments. The segments may be switched simultaneously or separately. Each segment includes one sub-pixel 102, 104, 106, 108 or a number of sub-pixels 102, 104, 106, 108 that may be neighboring or distant from one another. Sub-pixels 102, 104, 106, 108 included in one segment are switched simultaneously, for example. Electrowetting display device 100 may also be an active matrix driven display type or a passive matrix driven display, for example.

As described above, hydrophobic layer 184 is arranged on bottom support plate 120 to create an electrowetting surface area. The hydrophobic character of hydrophobic layer 184 causes first fluid 186 to adjoin preferentially to hydrophobic layer 184 because first fluid 186 has a higher wettability with respect to a top surface of hydrophobic layer 184 than second fluid 188 in the absence of a voltage. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

Figure 6:
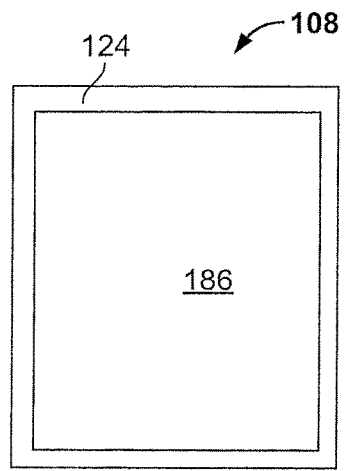
FIG. 6 a top view of an electrowetting sub-pixel with a first fluid distributed throughout the electrowetting sub-pixel.
Figure 7A:
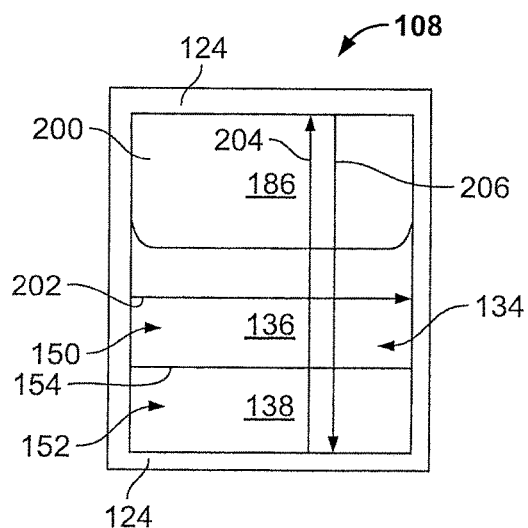
FIG. 7A is a top view of the electrowetting sub-pixel of FIG. 6 activated to expose at least a portion of a reflective layer positioned under the electrowetting sub-pixel, according to one embodiment.
Figure 7B:
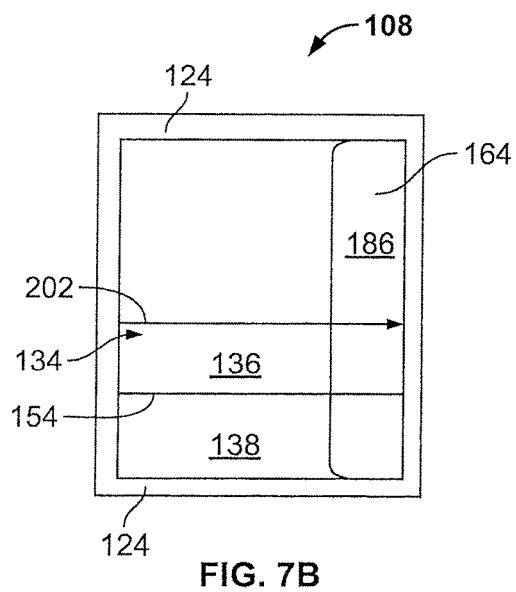
FIG. 7B is a top view of an alternative example electrowetting sub-pixel activated to expose at least a portion of a reflective layer positioned under the electrowetting sub-pixel, according to one embodiment.
Figure 8:
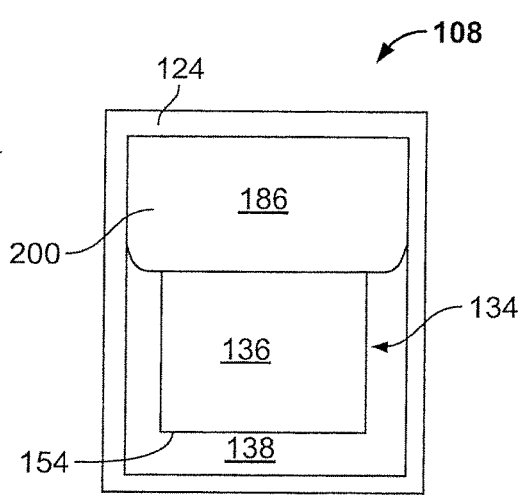
FIG. 8 is a top view of an alternative example electrowetting sub-pixel activated to expose at least a portion of a reflective layer positioned under the electrowetting sub-pixel, according to one embodiment.

FIG. 6 is a top view of white sub-pixel 108 in an inactive or off state with first fluid 186 distributed throughout white sub-pixel 108 to cover hydrophobic layer 184 and prevent or limit light from impinging upon reflective layer 134. If a voltage is applied across white sub-pixel 108, white sub-pixel 108 will enter into an active or on state, such as shown in FIGS. 7A, 7B, and 8 with at least a portion of reflective layer 134 exposed to second fluid 188. Electrostatic forces will move second fluid 188 (not shown in FIGS. 7A, 7B, and 8) toward electrode layer 128 within active white sub-pixel 108 as hydrophobic layer 184 formed within active white sub-pixel 108 becomes hydrophilic, thereby displacing first fluid 186 from an area of hydrophobic layer 184 to pixel walls 124 surrounding hydrophobic layer 184, such that first fluid 186 contracts to form a droplet 200, as shown in FIG. 7A for example.

Referring further to FIG. 7A, in certain embodiments first portion 150 including specular reflector 136 extends in a first direction 202 across a surface of white sub-pixel 108. In this example embodiment, first direction 202 extends between the lateral edges of white sub-pixel 108 parallel to a bottom edge of white sub-pixel 108. Second portion 152 including diffuse reflector 138 extends parallel to first portion 150 in first direction 202. As such, boundary 154 between specular reflector 136 and diffuse reflector 138 extends parallel to pixel wall 124 at the bottom edge of white sub-pixel 108. When a voltage is applied within white sub-pixel 108, first fluid 186 moves (in direction 204 shown in FIG. 7A) from second portion 152 of display surface area 122 to first portion 150 of display surface area 122 to at least partially expose display surface area 122. Such displacing action uncovers first fluid 186 from the surface of hydrophobic layer 184 of white sub-pixel 108 to expose at least a portion of diffuse reflector 138. As first fluid 186 moves into first portion 150, at least a portion of specular reflector 136 may also be exposed.

In an alternative embodiment, first fluid 186 moves from first portion 150 of display surface area 122 to second portion 152 of display surface area 122 to at least partially expose display surface area 122 when a voltage is applied within white sub-pixel 108. In this example, first fluid 186 moves from first portion 150 to second portion 152 to expose at least a portion of specular reflector 136. As first fluid 186 moves into second portion 152, at least a portion of diffuse reflector 138 may also be exposed.

Referring to FIG. 7B, in another alternative embodiment, the first fluid motion might be perpendicular to boundary 154 between specular reflector 136 and diffuse reflector 138. For example, first portion 150 and second portion 152 may extend in first direction 202 across white sub-pixel 108 and, with the voltage applied within white sub-pixel 108, first fluid 186 moves in first direction 202 to at least partially expose display surface area 122. As first fluid 186 is displaced, at least a portion of specular reflector 136 and at least a portion of diffuse reflector 138 are exposed. Moreover, a ratio between specular reflector 136 and diffuse reflector 138 may be variable over the display (i.e., between white sub-pixels 108), e.g., this ratio may vary based on a position of white sub-pixel 108 with respect to a color filter element or with respect to a position of white sub-pixel 108 with respect to a lightguide. Additionally, a ratio may also vary within white sub-pixel 108 upon opening of the sub-pixel, e.g., when boundary 154 is not parallel to either opposing pixel wall but at an angle with respect to the pixel wall. Further, in certain embodiments having green sub-pixels 104 with both a specular reflector 136 and a diffuse reflector 138, a ratio between specular reflector 136 and diffuse reflector 138 may be variable over the display (i.e., between green sub-pixels 104), e.g., this ratio may vary based on a position of green sub-pixel 104 with respect to a color filter element or with respect to a position of green sub-pixel 104 with respect to a lightguide. Additionally, a ratio may also vary within green sub-pixel 104 upon opening of the sub-pixel, e.g., when boundary 154 is not parallel to either opposing pixel wall but at an angle with respect to the pixel wall. In certain embodiments, as the driving voltage applied to white sub-pixel 108 is increased, first fluid 186 moves to expose a relatively larger portion of specular reflector 136 and/or diffuse reflector 138. A ratio of an exposed surface area of specular reflector 136 to an exposed surface area of diffuse reflector 138 will control a ratio of specular reflected light to diffuse reflected light changing an appearance of white sub-pixel 108. Light entering through top support plate 132 travels into white sub-pixel 108 and is reflected by specular reflector 136 and/or diffuse reflector 138.

FIG. 8 is a top view of white sub-pixel 108 in an active state with at least a portion of reflective layer 134 exposed to second fluid 188. As shown in FIG. 8, in this embodiment specular reflector 136 is positioned within a first portion of an electrowetting pixel region, e.g., a central region of white sub-pixel 108, and diffuse reflector 138 is positioned within a second portion of the electrowetting pixel region, e.g., diffuse reflector 138 extends around at least a portion of a perimeter of specular reflector 136. In certain embodiments, at least a portion of the perimeter of specular reflector 136, for example, a portion of the perimeter nearest pixel wall 124 opposite droplet 200 with white sub-pixel 108 in an active state, may have any suitable profile, such as a waveform, serpentine, or non-linear profile, at an edge of specular reflector 136.

With an electric potential applied to electrode layer 128 in activated white sub-pixel 108, second fluid 188 is attracted towards electrode layer 128 displacing first fluid 186 towards pixel wall 124 within activated white sub-pixel 108. In the example of FIGS. 7A and 8, first fluid 186 of white sub-pixel 108 has contracted to form droplet 200 of first fluid 186 as a result of an electric potential being applied to white sub-pixel 108. With white sub-pixel 108 in the active state, in certain embodiments at least a portion of specular reflector 136 and at least a portion of diffuse reflector 138 are exposed and light entering through top support plate 132 travels through white sub-pixel 108 and is reflected by specular reflector 136 and/or diffuse reflector 138. The reflected light then travels through top support plate 132 increasing the perceived brightness of white sub-pixel 108, thereby increasing an overall image quality of electrowetting display device 100. In the embodiment shown in FIG. 8, specular light reflected by specular reflector 136 may interact with diffuse light reflected by diffuse reflector 138 surrounding specular reflector 136 to minimize the effect of the directional specular reflection, for example, and provide an enhanced paper-like appearance.

Referring further to FIG. 7A, for example, in certain embodiments first portion 150 including specular reflector 136 extends in first direction 202 across a surface of white sub-pixel 108. In the example shown in FIG. 7A, first direction 202 extends between the lateral edges of white sub-pixel 108 parallel to a bottom edge of white sub-pixel 108. Second portion 152 including diffuse reflector 138 extends parallel to first portion 150 in first direction 202. As such, boundary 154 between specular reflector 136 and diffuse reflector 138 extends parallel to pixel wall 124 at the bottom edge of white sub-pixel 108. One or more sub-pixel electrodes are associated with white sub-pixel 108 for applying a voltage within white sub-pixel 108 to cause displacement of the first fluid to at least partially expose at least one of specular reflector 136 and diffuse reflector 138. For example, with a voltage applied within white sub-pixel 108, first fluid 186 moves in second direction 204 across the surface of white sub-pixel 108 perpendicular to first direction 202 to at least partially expose diffuse reflector 138 within second portion 152. In the example shown in FIG. 7A, first fluid 186 moves in second direction 204 from the bottom edge of white sub-pixel 108 toward a top edge of white sub-pixel 108 to form droplet 200. In a particular embodiment, first fluid 186 continues to move toward the top edge of white sub-pixel 108, exposing all of diffuse reflector 138 and at least a portion of specular reflector 136 within first portion 150. In an alternative embodiment, with a voltage applied within white sub-pixel 108, first fluid 186 moves in a third direction 206 across the surface of white sub-pixel 108 opposite second direction 204 and perpendicular to first direction 202 to at least partially expose specular reflector 136 within first portion 150. In this embodiment, as first fluid 186 continues to move in third direction 206, all of specular reflector 136 is exposed and at least a portion of diffuse reflector 138 within second portion 152 may be exposed.

Referring further to FIG. 7B, in a further embodiment with first portion 150 and second portion 152 extending parallel to each other in first direction 202, boundary 154 between specular reflector 136 and diffuse reflector 138 extends parallel to pixel wall 124 at the bottom edge of white sub-pixel 108. One or more sub-pixel electrodes are associated with white sub-pixel 108 for applying a voltage within white sub-pixel 108 to cause displacement of first fluid 186 to at least partially expose specular reflector 136 and diffuse reflector 138. For example, with a voltage applied within white sub-pixel 108, first fluid 186 moves in first direction 202, i.e., from one lateral edge toward the opposing lateral edge of white sub-pixel 108. As first fluid 186 moves in first direction 202, specular reflector 136 within first portion 150 and diffuse reflector 138 within second portion 152 are exposed substantially simultaneously. As first fluid 186 continues to move across the surface of white sub-pixel 108, specular reflector 136 and diffuse reflector 138 are exposed and light entering white sub-pixel 108 may be reflected by specular reflector 136 within first portion 150 and/or diffuse reflector 138 within second portion 152. In alternative embodiments, first fluid 186 may move in any desired direction, not necessarily only in first direction 202, second direction 204, and/or third direction 206. Moreover, in certain embodiments, specular reflector 136 may be positioned within second portion 152 and diffuse reflector 138 may be positioned within first portion 150. These example embodiments as shown in FIGS. 7A, 7B, and 8 are not limiting with respect to locations of specular reflector 136 and diffuse reflector 138 and/or a ratio of specular reflector 136 to diffuse reflector 138 within reflective layer 134, and claimed subject matter is not limited in this respect. For example, in one embodiment, a first pixel electrode is associated with a first portion of a pixel region, e.g., a sub-pixel, for applying a voltage within the pixel region, e.g., the sub-pixel, to cause displacement of the first fluid in a first direction and a second pixel electrode is associated with a second portion of the pixel region, e.g., the sub-pixel, for applying a voltage within the pixel region, e.g., the sub-pixel, to cause displacement of the first fluid in a second direction different from the first direction.

After activation shown in FIGS. 7A and 8 for example, when the voltage across white sub-pixel 108 is returned to an inactive signal level of zero or a value near to zero, white sub-pixel 108 will return to an inactive state, as shown in FIG. 6, such that first fluid 186 is distributed throughout white sub-pixel 108. In this way, first fluid 186 forms an electrically controllable optical switch in white sub-pixel 108.

Desired optical performance, such as an optimization of brightness and diffusion characteristics of electrowetting display device 100, can be achieved through reflective layer design. Adjusting a number and/or a configuration of specular reflectors 136 and/or diffuse reflectors 138 within reflective layer 134, for example, as well as adjusting a volume of first fluid 186 within a respective sub-pixel 102, 104, 106, 108, can achieve such desired optical performance. Diffuse reflectance in a display can significantly enhance the viewing angle performance, i.e., increase an angle measured from an axis normal to the top support plate at which a user is able to view the content displayed, under various illumination or lighting conditions.

Figure 9:
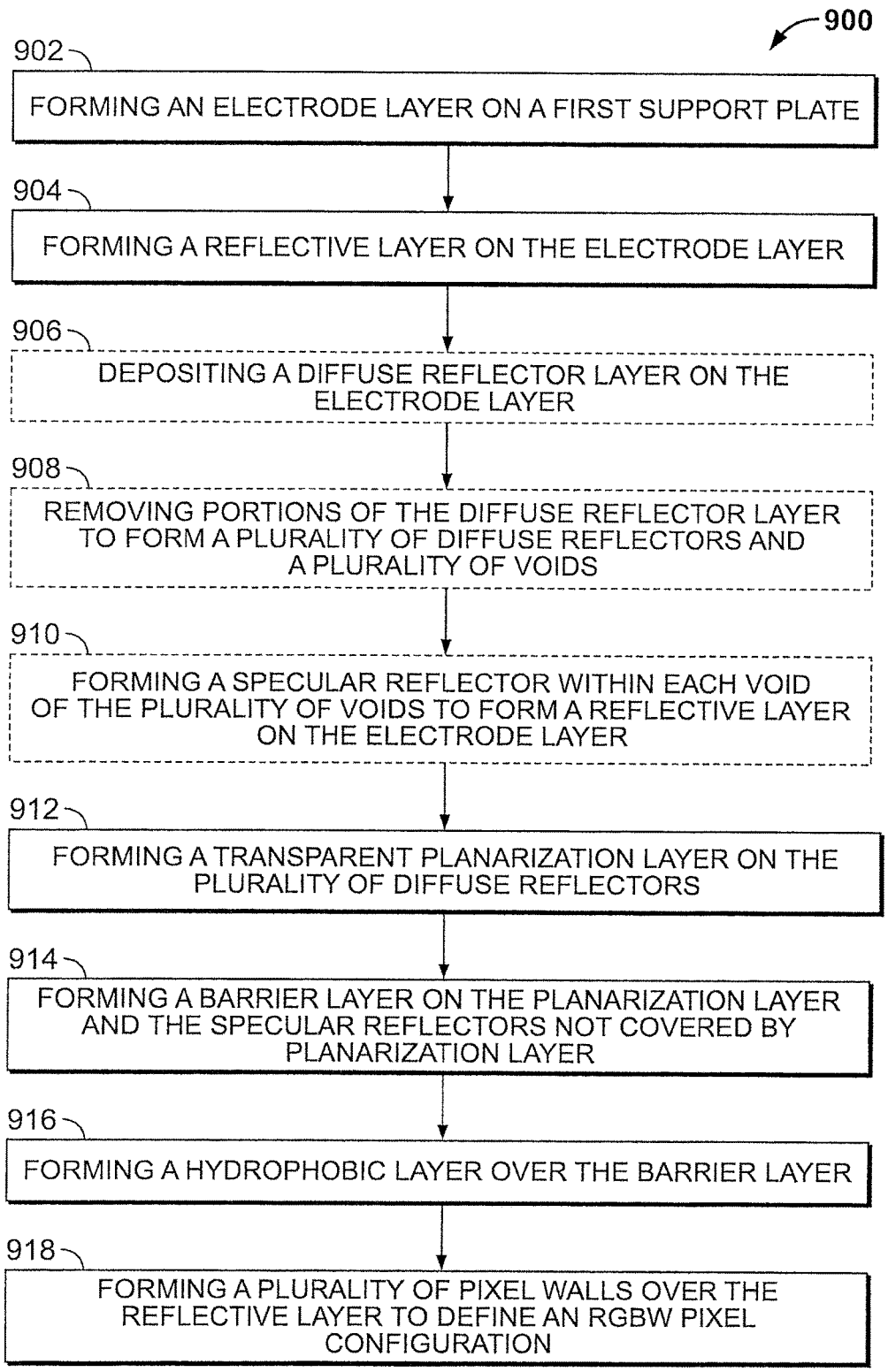
FIG. 9 illustrates an example method for fabricating the electrowetting display device of FIGS. 1-3.

FIG. 9 is a flow diagram of an example method 900 for fabricating an electrowetting display device, such as electrowetting display device 100 including reflective layer 134 as shown in FIGS. 1-3. Though claimed subject matter is not limited in this respect, process 900 may be performed manually (e.g., by humans) and/or using automatic equipment. At block 902, an electrode layer 128 is formed on first or bottom support plate 104. In this embodiment, electrode layer 128 is deposited on bottom support plate 104. Additional layers may be positioned between electrode layer 128 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), physical vapor deposition (PVD), molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and a sputtering, for example.

Reflective layer 134 is then formed in block 904 on electrode layer 128. In one embodiment, as shown in FIG. 9, forming 904 reflective layer 134 on electrode layer 128 includes forming, e.g., depositing, 906 a diffuse reflector layer on or over electrode layer 128. A plurality of portions of the diffuse reflector layer are removed 908 to form a plurality of diffuse reflectors 138 and a plurality of voids. A specular reflector is then formed 910 within each void of the plurality of voids in the diffuse reflector layer to form a plurality of specular reflectors 136. As a result of this process, each specular reflector 136 is positioned with respect to or within a first sub-pixel corresponding to one of a red sub-pixel 102, a green sub-pixel 104, or a blue sub-pixel 106, and each diffuse reflector 138 is positioned with respect to or within a second sub-pixel corresponding to a white sub-pixel 108. In a particular embodiment, a transparent planarization layer 180 is formed 912 on the plurality of diffuse reflectors 138 to enhance the electrowetting properties of white sub-pixels 108. More specifically, planarization layer 180 may provide a desired smoothness to the surface to enhance oil movement without negatively affecting optical performance of white sub-pixels 108. This process forms reflective layer 134 as shown in FIGS. 1 and 2. A suitable barrier layer 140 is formed 914 on the planarization layer and the specular reflectors not covered by planarization layer 180.

In an alternative embodiment not illustrated in FIG. 9, forming 904 reflective layer 134 on electrode layer 128 includes forming a specular reflector layer on the electrode layer. Portions of the specular reflector layer are removed to form a plurality of specular reflectors and a plurality of voids. A diffuse reflector layer is then deposited within the removed portions of the specular reflector layer to form a plurality of diffuse reflectors. As a result, each specular reflector 136 is positioned with respect to or within a first sub-pixel corresponding to one of a red sub-pixel 102, a green sub-pixel 104, or a blue sub-pixel 106 or, in particular embodiments, a portion of a white sub-pixel 108, and each diffuse reflector 138 is positioned with respect to or within a second sub-pixel corresponding to a white sub-pixel 108, to form reflective layer 134 as shown in FIGS. 1 and 2. A hydrophobic layer, such as an AF 1600® layer, (e.g., hydrophobic layer 184, shown in FIGS. 1 and 2) is formed 916 over barrier layer 140.

At block 918, a plurality of pixel walls 124 are formed over the reflective layer to define an RGBW pixel configuration 101 on hydrophobic layer 184. In one embodiment, pixel walls 124 include a photoresist material such as, for example, epoxy-based negative photoresist SU-8. In one embodiment, a photoresist material is deposited over the multilayer stack and at block 918 the photoresist material is exposed to a suitable mask to form pixel walls 124. In alternative embodiments, these structures may be printed using suitable methods other than photolithography, including, without limitation, direct writing and electron beam lithography (EBL). The pixel walls 124 are cured and fused together and the uncured portions of the photoresist material are removed to leave pixel wall 124.

The RGBW pixel configuration 101 formed at block 918 includes a pixel region having a plurality of pixel walls associated with a plurality of electrowetting sub-pixels arranged in a plurality of rows and a plurality of columns that form an array of electrowetting sub-pixels 102, 104, 106, 108, such as shown in FIG. 3, having a suitable width and length. Each specular reflector 136 formed within each void at block 910 is positioned within a first electrowetting sub-pixel corresponding to one of a red sub-pixel 102, a green sub-pixel 104, or a blue sub-pixel 106 or, in particular embodiments, a portion of a white sub-pixel 108, and each diffuse reflector 134 formed at block 908 is positioned within a second electrowetting sub-pixel corresponding to a white sub-pixel 108. A filter layer is positioned over the plurality of pixel walls. The filter layer has one of a red color filter, a green color filter, or a blue color filter associated with each of the first electrowetting sub-pixels and a white color filter associated with each of the second electrowetting sub-pixels. For example, in one embodiment, one of a red color filter, a green color filter or a blue color filter is positioned within each first electrowetting sub-pixel and a white color filter is positioned within each second electrowetting sub-pixel.

Following formation of the pixel walls, first fluid 186 and second fluid 188 (e.g., the oil and the electrolyte solution) can be disposed within electrowetting sub-pixels 102, 104, 106, 108 of electrowetting display device 100. A second support plate, such as top support plate 132, is coupled to electrowetting display device 100. As shown in FIGS. 1 and 2 for example, top support plate 132 is opposite bottom support plate 104, forming opposing outer surfaces of electrowetting display device 100.

Figure 10:
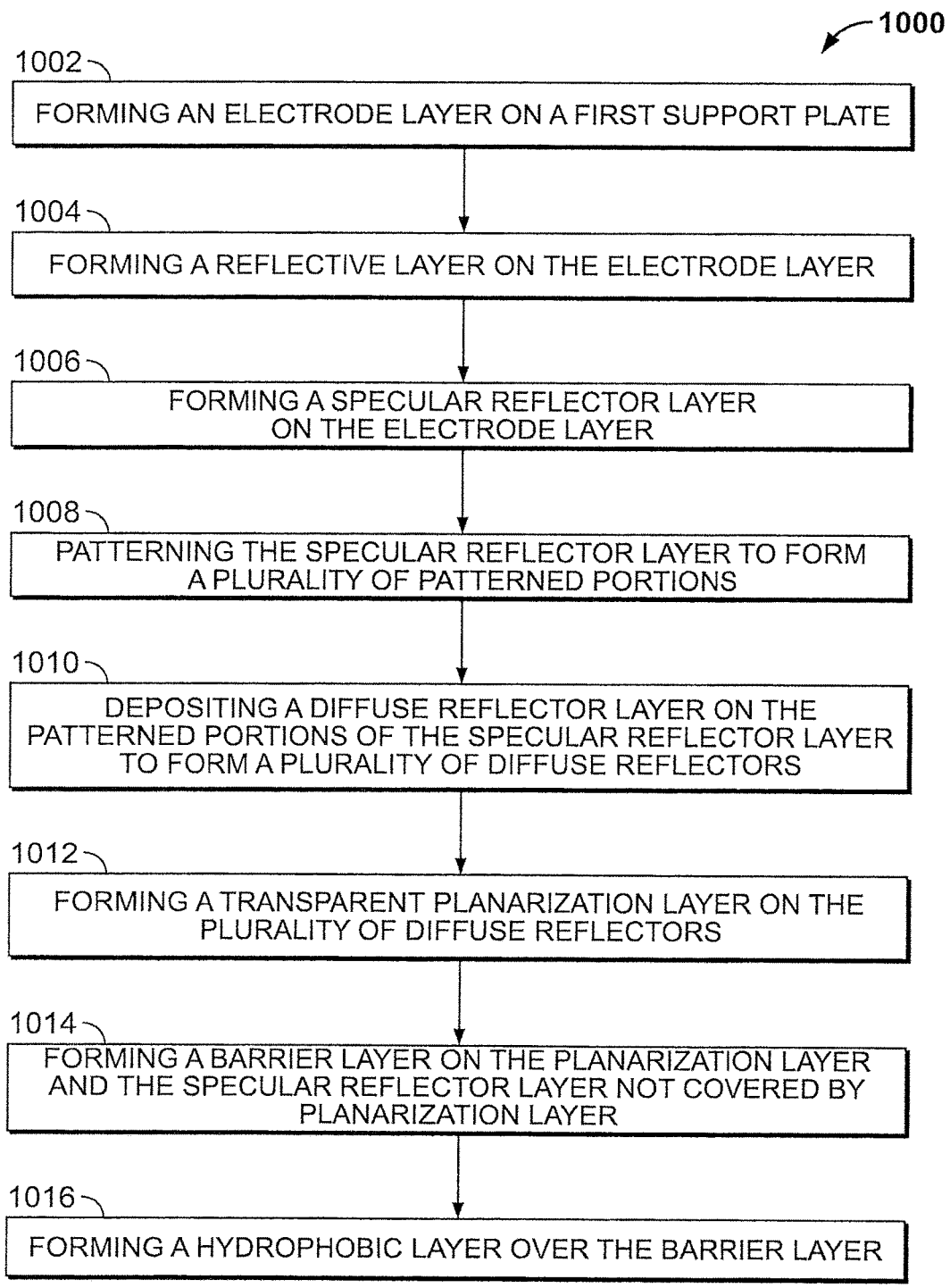
FIG. 10 illustrates an alternative example method for fabricating the electrowetting display device of FIG. 5.

FIG. 10 is a flow diagram of an alternative example method 1000 for fabricating an electrowetting display device, such as electrowetting display device 100 including reflective layer 134 as shown in FIG. 5. While specular reflector 136 and diffuse reflector 138 formed using method 900 includes, in certain embodiments, patterned deposition of the respective reflector layers to create separate reflector structures, method 1000 may provide a manufacturing simplification by patterning, e.g., etching, a specular reflector layer (which forms a plurality of specular reflectors) and forming a plurality of diffuse reflectors in respective patterned portions of the specular reflector layer. Though claimed subject matter is not limited in this respect, method 1000 may be performed manually (e.g., by humans) and/or using automatic equipment. At block 1002, an electrode layer 128 is formed on first or bottom support plate 104. In this embodiment, electrode layer 128 is deposited on bottom support plate 104. Additional layers may be positioned between electrode layer 128 and bottom support plate 104. In one embodiment, a multilayer stack including a first conductive layer is formed on bottom support plate 104. In this embodiment, the multilayer stack is formed on bottom support plate 104 as described above with reference to method 900 of FIG. 9.

Reflective layer 134 is then formed in block 1004 on electrode layer 128. Referring to FIG. 10, in this embodiment forming 1004 reflective layer 134 on electrode layer 128 includes forming 1006 a specular reflector layer on electrode layer 128. A plurality of portions of the specular reflector layer are patterned 1008 to form a plurality of patterned portions and a patterned diffuse reflector layer is deposited 1010 on the patterned portions of specular reflector layer to form a plurality of diffuse reflectors 138. In this embodiment, each formed specular reflector 136 is positioned within a first electrowetting sub-pixel corresponding to one of a red sub-pixel 102, a green sub-pixel 104, or a blue sub-pixel 106 or, in particular embodiments, a portion of a white sub-pixel 108, and each formed diffuse reflector 138 is positioned within a second electrowetting sub-pixel corresponding to a white sub-pixel 108. More specifically, in the particular embodiments in which a portion of white sub-pixel 108 includes specular reflector 136, diffuse reflector 138 is deposited on at least a portion of the specular reflector layer such that a portion of specular reflector 136 within white sub-pixel 108 is underneath diffuse reflector 138. In a particular embodiment, transparent planarization layer 180 is formed 1012 on the plurality of diffuse reflectors 138 and a suitable barrier layer 140 is formed 1014 on the planarization layer and the specular reflector layer not covered by planarization layer 180. This process forms diffuse reflector 138 as shown in FIG. 5.

A hydrophobic layer (e.g., hydrophobic layer 184, illustrated in FIGS. 4 and 5) is formed 1016 over barrier layer 140. In this embodiment, method 1000 continues as described above with respect to method 900 of FIG. 9 to form pixel walls 124 and build the remaining portions of electrowetting display device 100.

Figure 11:
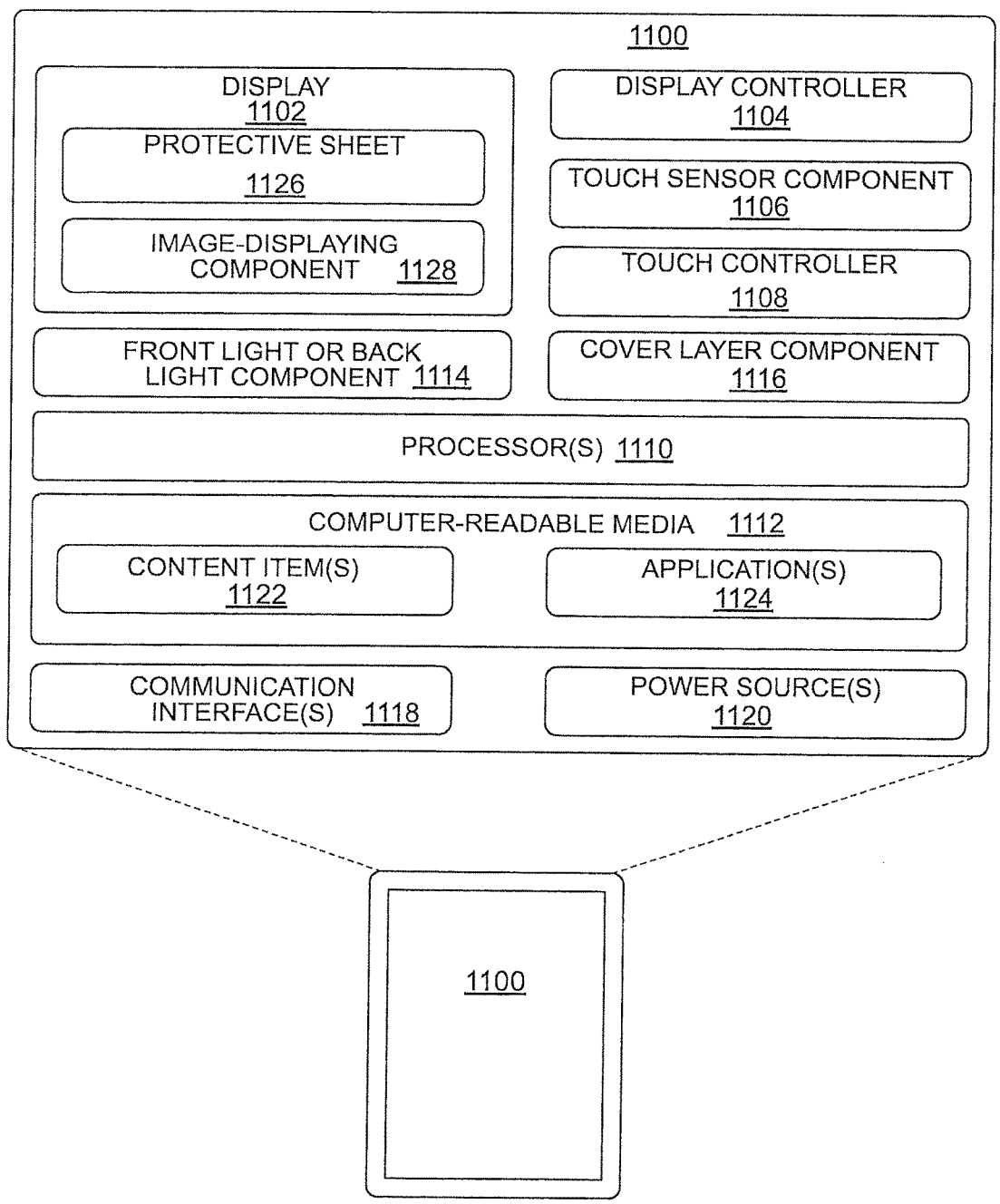
FIG. 11 illustrates an example electronic device that may incorporate an electrowetting display device, according to various embodiments.

FIG. 11 illustrates an example electronic device, such as an electrowetting display device 1100, that may incorporate any of the display devices discussed above. Electrowetting display device 1100 may comprise any type of electronic device having a display. For instance, electrowetting display device 1100 may be a mobile electronic device (e.g., an electronic book reader, a tablet computing device, a laptop computer, a smart phone or other multifunction communication device, a portable digital assistant, a wearable computing device, or an automotive display). Alternatively, electrowetting display device 1100 may be a non-mobile electronic device (e.g., a computer display or a television). In addition, while FIG. 11 illustrates several example components of electrowetting display device 1100, it is to be appreciated that electrowetting display device 1100 may also include other conventional components, such as an operating system, system busses, input/output components, and the like. Further, in other embodiments, such as in the case of a television or computer monitor, electrowetting display device 1100 may only include a subset of the components illustrated.

Regardless of the specific implementation of electrowetting display device 1100, electrowetting display device 1100 includes a display 1102 and a corresponding display controller 1104. Display 1102 may represent a reflective or transmissive display in some instances or, alternatively, a transflective display (partially transmissive and partially reflective).

In one embodiment, display 1102 comprises an electrowetting display that employs an applied voltage to change the surface tension of a fluid in relation to a surface. For example, such an electrowetting display may include the array of pixels 102 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 1102 are independently activated, display 1102 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "white" value of the pixel may correspond to a deepest red or most luminant red of the color filter. The open state of the pixel—the white state—represents the colored state like a red pixel, while the closed state of the pixel—the black state—is black due to the color of the oil (also depending on the color of the oil). Furthermore, while some examples herein are described in the environment of a reflective display, in other examples, display 1102 may represent a backlit display, examples of which are mentioned above.

In addition to including display 1102, FIG. 11 illustrates that some examples of electrowetting display device 1100 may include a touch sensor component 1106 and a touch controller 1108. In some instances, at least one touch sensor component 1106 resides with, or is stacked on, display 1102 to form a touch-sensitive display. Thus, display 1102 may be capable of both accepting user touch input and rendering content in response to or corresponding to the touch input. As several examples, touch sensor component 1106 may comprise a capacitive touch sensor, a force sensitive resistance (FSR), an interpolating force sensitive resistance (IFSR) sensor, or any other type of touch sensor. In some instances, touch sensor component 1106 is capable of detecting touches as well as determining an amount of pressure or force of these touches.

FIG. 11 further illustrates that electrowetting display device 1100 may include one or more processors 1110 and one or more computer-readable media 1112, as well as a front light component 1114 (which may alternatively be a backlight component in the case of a backlit display) for lighting display 1102, a cover layer component 1116, such as a cover glass or cover sheet, one or more communication interfaces 1118 and one or more power sources 1120. The communication interfaces 1118 may support both wired and wireless connection to various networks, such as cellular networks, radio, WiFi networks, short range networks (e.g., Bluetooth®), and infrared (IR) networks, for example.

Depending on the configuration of electrowetting display device 1100, computer-readable media 1112 (and other computer-readable media described throughout) is an example of computer storage media and may include volatile and nonvolatile memory. Thus, computer-readable media 1112 may include, without limitation, RAM, ROM, EEPROM, flash memory, and/or other memory technology, and/or any other suitable medium that may be used to store computer-readable instructions, programs, applications, media items, and/or data which may be accessed by electrowetting display device 1100.

Computer-readable media 1112 may be used to store any number of functional components that are executable on processor 1110, as well as content items 1122 and applications 1124. Thus, computer-readable media 1112 may include an operating system and a storage database to store one or more content items 1122, such as eBooks, audio books, songs, videos, still images, and the like. Computer-readable media 1112 of electrowetting display device 1100 may also store one or more content presentation applications to render content items on electrowetting display device 1100. These content presentation applications may be implemented as various applications 1124 depending upon content items 1122. For instance, the content presentation application may be an electronic book reader application for rending textual electronic books, an audio player for playing audio books or songs, or a video player for playing video.

In some instances, electrowetting display device 1100 may couple to a cover (not illustrated in FIG. 11) to protect the display 1102 (and other components in the display stack or display assembly) of electrowetting display device 1100. In one example, the cover may include a back flap that covers a back portion of electrowetting display device 1100 and a front flap that covers display 1102 and the other components in the stack. Electrowetting display device 1100 and/or the cover may include a sensor (e.g., a Hall effect sensor) to detect whether the cover is open (i.e., if the front flap is not atop display 1102 and other components). The sensor may send a signal to front light component 1114 if the cover is open and, in response, front light component 1114 may illuminate display 1102. If the cover is closed, meanwhile, front light component 1114 may receive a signal indicating that the cover has closed and, in response, front light component 1114 may turn off.

Furthermore, the amount of light emitted by front light component 1114 may vary. For instance, upon a user opening the cover, the light from the front light may gradually increase to its full illumination. In some instances, electrowetting display device 1100 includes an ambient light sensor (not illustrated in FIG. 11) and the amount of illumination of front light component 1114 may be based at least in part on the amount of ambient light detected by the ambient light sensor. For example, front light component 1114 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 1102 may vary depending on whether front light component 1114 is on or off, or based on the amount of light provided by front light component 1114. For instance, electrowetting display device 1100 may implement a larger default font or a greater contrast when the light is off compared to when the light is on. In some embodiments, electrowetting display device 1100 maintains, if the light is on, a contrast ratio for display 1102 that is within a certain defined percentage of the contrast ratio if the light is off.

As described above, touch sensor component 1106 may comprise a capacitive touch sensor that resides atop display 1102. In some examples, touch sensor component 1106 may be formed on or integrated with cover layer component 1116. In other examples, touch sensor component 1106 may be a separate component in the stack of the display assembly. Front light component 1114 may reside atop or below touch sensor component 1106. In some instances, either touch sensor component 1106 or front light component 1114 is coupled to a top surface of a protective sheet 1126 of display 1102. As one example, front light component 1114 may include a lightguide sheet and a light source (not illustrated in FIG. 11). The lightguide sheet may comprise a substrate (e.g., a transparent thermoplastic such as PMMA or other acrylic), a layer of lacquer and multiple grating elements formed in the layer of lacquer that function to propagate light from the light source towards display 1102; thus, illuminating display 1102.

Cover layer component 1116 may include a transparent substrate or sheet having an outer layer that functions to reduce at least one of glare or reflection of ambient light incident on electrowetting display device 1100. In some instances, cover layer component 1116 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, protective sheet 1126 may include a similar UV-cured hard coating on the outer surface. Cover layer component 1116 may couple to another component or to protective sheet 1126 of display 1102. Cover layer component 1116 may, in some instances, also include a UV filter, a UV-absorbing dye, or the like, for protecting components lower in the stack from UV light incident on electrowetting display device 1100. In still other examples, cover layer component 1116 may include a sheet of high-strength glass having an antiglare and/or antireflective coating.

Display 1102 includes protective sheet 1126 overlying an image-displaying component 1128. For example, display 1102 may be preassembled to have protective sheet 1126 as an outer surface on the upper or image-viewing side of display 1102. Accordingly, protective sheet 1126 may be integral with and may overlay image-displaying component 1128. Protective sheet 1126 may be optically transparent to enable a user to view, through protective sheet 1126, an image presented on image-displaying component 1128 of display 1102.

In some examples, protective sheet 1126 may be a transparent polymer film in the range of 25 to 200 micrometers in thickness. As several examples, protective sheet 1126 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 1126 may include a coating, such as the hard coating described above. For instance, the hard coating may be applied to the outer surface of protective sheet 1126 before or after assembly of protective sheet 1126 with image-displaying component 1128 of display 1102. In some examples, the hard coating may include a photoinitiator or other reactive species in its composition, such as for curing the hard coating on protective sheet 1126. Furthermore, in some examples, protective sheet 1126 may be dyed with a UV-light-absorbing dye, or may be treated with other UV-absorbing treatment. For example, protective sheet 1126 may be treated to have a specified UV cutoff such that UV light below a cutoff or threshold wavelength is at least partially absorbed by protective sheet 1126, thereby protecting image-displaying component 1128 from UV light.

According to some embodiments herein, one or more of the components discussed above may be coupled to display 1102 using fluid optically-clear adhesive (LOCA). For example, the light guide portion of front light component 1114 may be coupled to display 1102 by placing LOCA on the outer or upper surface of protective sheet 1126. If the LOCA reaches the corner(s) and/or at least a portion of the perimeter of protective sheet 1126, UV-curing may be performed on the LOCA at the corners and/or the portion of the perimeter. Thereafter, the remaining LOCA may be UV-cured and front light component 1114 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 1114. In other embodiments, the LOCA may be placed near a center of protective sheet 1126, and pressed outwards towards a perimeter of the top surface of protective sheet 1126 by placing front light component 1114 on top of the LOCA. The LOCA may then be cured by directing UV light through front light component 1114. As discussed above, and as discussed additionally below, various techniques, such as surface treatment of the protective sheet, may be used to prevent discoloration of the LOCA and/or protective sheet 1126.

While FIG. 11 illustrates a few example components, electrowetting display device 1100 may have additional features or functionality. For example, electrowetting display device 1100 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electrowetting display device 1100 may reside remotely from electrowetting display device 1100 in some implementations. In these implementations, electrowetting display device 1100 may utilize communication interfaces 1118 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device, comprising:
a first support plate and a second support plate;
an electrowetting pixel region between the first support plate and the second support plate, the electrowetting pixel region comprising a red sub-pixel, a green sub-pixel, a blue sub-pixel and a white sub-pixel, a perimeter of a display surface area of each of the red sub-pixel, the green sub-pixel, the blue sub-pixel and the white sub-pixel determined by one or more walls; and a reflective layer in the electrowetting pixel region, the reflective layer having a plane comprising the display surface area of each of the red sub-pixel, the green sub-pixel, the blue sub-pixel and the white sub-pixel, the reflective layer comprising:
   a plurality of planar specular reflectors, a corresponding planar specular reflector of the plurality of planar specular reflectors within each of the red sub-pixel, the green sub-pixel, and the blue sub-pixel, wherein a corresponding reflective surface of the corresponding planar specular reflector is closest to the corresponding display surface area, and is at least substantially the same size as the corresponding display surface area of each of the red sub-pixel, the green sub-pixel, and the blue sub-pixel;
   an additional planar specular reflector of the plurality of planar specular reflectors within a first portion of the white sub-pixel, a reflective surface of the additional planar specular reflector smaller than the display surface area of the white sub-pixel; and
   a planar diffuse reflector within a second portion of the white sub-pixel and coplanar with the additional planar specular reflector, wherein the display surface area of the white sub-pixel covers the additional planar specular reflector in the first portion and the planar diffuse reflector in the second portion.

2. The electrowetting display device of claim 1, further comprising an electrode layer on the first support plate, wherein the additional planar specular reflector has a first surface adjacent the electrode layer and the planar diffuse reflector has a second surface adjacent the electrode layer and coplanar with the first surface.

3. A display device, comprising:
   a first support plate;
   a first pixel region on the first support plate, the first pixel region comprising a first sub-pixel and a second sub-pixel; and
   a reflective layer having a plane comprising: a first display surface area of the first sub-pixel, and a second display surface area of the second sub-pixel, a perimeter of each of the first display surface area and the second display surface area determined by one or more walls, the reflective layer comprising:
      a first planar specular reflector comprising a first reflective surface closest to the first display surface area;
      a second planar specular reflector comprising a second reflective surface closest to the second display surface area; and
      a planar diffuse reflector adjacent to and coplanar with the second planar specular reflector,
   wherein
      the first sub-pixel comprises the first planar specular reflector, and the first reflective surface is at least substantially the same size as the first display surface area;
   and
      the second sub-pixel comprises:
         a first portion comprising the second planar specular reflector, the second reflective surface smaller than the second display surface area; and
         a second portion comprising the planar diffuse reflector, and the second display surface area of the second sub-pixel covers the second planar specular reflector and the planar diffuse reflector.

4. The display device of claim 3, further comprising:
   a second support plate coupled to the first support plate, the first pixel region between the first support plate and the second support plate;
   a first fluid and a second fluid that is immiscible with the first fluid, the first fluid and the second fluid between the first support plate and the second support plate; and
   a plurality of sub-pixel electrodes, a first sub-pixel electrode of the plurality of sub-pixel electrodes associated with the first sub-pixel for applying a voltage within the first sub-pixel to cause displacement of the first fluid within the first sub-pixel.

5. The display device of claim 4, wherein the first sub-pixel electrode comprises the first planar specular reflector.

6. The display device of claim 3, wherein the first sub-pixel comprises one of a red sub-pixel, a green sub-pixel, or a blue sub-pixel and the second sub-pixel comprises a white sub-pixel.

7. The display device of claim 6, further comprising a color filter layer within the first pixel region, the color filter layer having a first color filter associated with the first sub-pixel as one of the red sub-pixel, the green sub-pixel, or the blue sub-pixel, and a second color filter associated with the second sub-pixel as the white sub-pixel.

8. The display device of claim 3, wherein each of the first sub-pixel and the second sub-pixel has a diffusivity equal to or greater than 50%.

9. The display device of claim 3, wherein the second sub-pixel comprises a white sub-pixel having a first diffusivity equal to or greater than 50%.

10. The display device of claim 9, further comprising a second pixel region including a first sub-pixel and a second sub-pixel, the second sub-pixel of the second pixel region comprising a white sub-pixel having a second diffusivity different from the first diffusivity.

11. The display device of claim 3, wherein the first pixel region further comprises a third sub-pixel and a fourth sub-pixel, and a planar reflector within each of the first sub-pixel, the third sub-pixel, and the fourth sub-pixel, wherein the only planar reflector within each of the first sub-pixel, the third sub-pixel and the fourth sub-pixel is a planar specular reflector, wherein the planar specular reflector within the first sub-pixel is the first planar specular reflector.

12. The display device of claim 3, wherein the second sub-pixel comprises a white sub-pixel and the first pixel region further comprises a third sub-pixel comprising a green sub-pixel, wherein a third planar specular reflector is within a first portion of the third sub-pixel and a second planar diffuse reflector is within a second portion of the third sub-pixel adjacent to and coplanar with the third planar specular reflector, and a display surface area of the third sub-pixel covers the third planar specular reflector and the second planar diffuse reflector.

13. The display device of claim 3, wherein the first planar specular reflector within the first sub-pixel is the only planar specular reflector of the reflective layer within the first sub-pixel.

14. The display device of claim 3, wherein the first pixel region further comprises a third sub-pixel and a planar reflector within each of the first sub-pixel and the third sub-pixel, wherein the only planar reflector of the reflective layer within each of the first sub-pixel and the third sub-pixel is a planar specular reflector, wherein the planar specular reflector of the first sub-pixel is the first planar specular reflector.

15. An electrowetting display device, comprising:
a first support plate and a second support plate;
an electrowetting pixel region positioned between the first support plate and the second support plate, the electrowetting pixel region comprising a first sub-pixel, a second sub-pixel, a third sub-pixel and a fourth sub-pixel, a perimeter of a display surface area of each of the first sub-pixel, the second sub-pixel, the third sub-pixel and the fourth sub-pixel determined by one or more walls;
a reflective layer in the electrowetting pixel region, the reflective layer having a plane comprising the display surface area of each of the first sub-pixel, the second sub-pixel, the third sub-pixel and the fourth sub-pixel, the reflective layer comprising:
a plurality of planar specular reflectors, a corresponding planar specular reflector of the plurality of planar specular reflectors within each of the first sub-pixel, the second sub-pixel, the third sub-pixel, and a first portion of the fourth sub-pixel, a corresponding reflective surface of the corresponding planar specular reflector is closest to the corresponding display surface area, and is at least substantially the same size as the corresponding display surface area of each of the first sub-pixel, the second sub-pixel, and the third sub-pixel; and
a planar diffuse reflector within a second portion of the fourth sub-pixel and coplanar with the corresponding planar specular reflector, wherein the display surface area of the fourth sub-pixel covers the planar specular reflector in the first portion and the planar diffuse reflector in the second portion.

16. The electrowetting display device of claim 15, wherein the second sub-pixel comprises a green sub-pixel and the fourth sub-pixel comprises a white sub-pixel.

17. The electrowetting display device of claim 15, further comprising:
a first fluid and a second fluid that is immiscible with the first fluid, the first fluid and the second fluid between the first support plate and the second support plate; and
a sub-pixel electrode associated with the first sub-pixel for applying a voltage within the first sub-pixel to cause displacement of the first fluid within the first sub-pixel, wherein the first sub-pixel electrode comprises the corresponding planar specular reflector within the first sub-pixel.

* * * * *